United States Patent [19]

Dreisig et al.

[11] Patent Number: 4,858,980
[45] Date of Patent: Aug. 22, 1989

[54] ARTICLE GRIPPER

[75] Inventors: Robert C. Dreisig, West Chester; David I. McDonald, Cincinnati, both of Ohio

[73] Assignee: Cincinnati Milacron Inc., Cincinnati, Ohio

[21] Appl. No.: 235,255

[22] Filed: Aug. 23, 1988

[51] Int. Cl.[4] .............................................. B25B 5/08
[52] U.S. Cl. ................... 294/99.1; 267/158; 267/160; 267/181; 24/545; 248/316.7
[58] Field of Search ............................. 294/99.1, 99.2; 267/158, 160, 181; 248/316.5, 316.7; 24/545, 546

[56] References Cited

U.S. PATENT DOCUMENTS

| 221,389 | 11/1879 | Birch | 294/99.1 |
|---|---|---|---|
| 3,074,147 | 1/1963 | Miller et al. | 29/26 |
| 3,726,557 | 4/1973 | Ventre | 294/99.1 |
| 3,911,540 | 10/1975 | Johnson et al. | 29/26 |
| 3,987,909 | 10/1976 | Piotrowski | 214/1 |
| 4,053,968 | 10/1977 | Johnson et al. | 29/26 |
| 4,135,278 | 1/1979 | Kitamura | 29/26 |
| 4,397,438 | 8/1983 | Chapman | 248/316.7 |
| 4,505,020 | 3/1985 | Kinoahira | 29/568 |
| 4,540,211 | 9/1985 | Masserang | 294/99.1 |
| 4,591,119 | 5/1986 | Kraus | 248/316.7 |
| 4,605,349 | 8/1986 | Bone | 409/141 |

FOREIGN PATENT DOCUMENTS 3511470  3/1985  Fed. Rep. of Germany .

OTHER PUBLICATIONS

"The Push for a Toolholder Standard" *American Machinist*, Jul. 1, 1975, DuPont Delrin Design Handbook Publ. No. A-84530 Rev. 1-73.
Machinery's Handbook Eighteenth Edition-1968 Industrial Press Inc. Cincinnati Milacron "HPMC" Product Brochure.

*Primary Examiner*—Johnny D. Cherry
*Assistant Examiner*—V. Nishanian
*Attorney, Agent, or Firm*—Thomas M. Farrell

[57] ABSTRACT

An article gripper with a fixed jaw has a movable jaw mounted on reed springs. Deflection of the movable jaw permits the article to enter and exit the gripper. The movable jaw has an inlet cam surface and an outlet cam surface, configured so that a low-level inlet force deflects the jaw and reeds laterally, while a higher-level outlet, or removal, force is directed parallel to the reed springs causing the jaw to behave stiffly and thus resist pullout of the article.

27 Claims, 8 Drawing Sheets

ARTICLE GRIPPER

BACKGROUND OF THE INVENTION

The invention relates broadly to the field of article grippers and, in particular, the invention relates to tool grippers used for tool storage magazines, and to article gripper mechanisms such as part loaders which may be used with machine tools A variety of article grippers have been used in conjunction with tool handling and part handling machinery, where the tool grippers are often configured as having a pair of fingers or jaws which may be opened and closed in a pincer like movement to grasp the desired article. Most often the gripper fingers are relatively powered with respect to one another by fluid power actuators such as air cylinders. The devices are also frequently fitted with a "fail-safe" mechanism to maintain grasp of the article in the event of a power failure.

The prior art devices are typically of complex construction. having high cost and relatively high maintenance requirements to insure reliability.

Applicants have studied the inherent problems associated with applying article grippers in a variety of spatial orientations, and have determined that modern requirements for machine tools, in particular, dictate that low cost be an objective in the overall design of the device.

Applicants have designed an article gripper which uses certain spring elements arranged in a manner so that the removal force to extract a tool, for instance, from the article gripper is substantially higher than the insertion force to introduce a tool into the gripper.

The design achieved lends itself well to an article gripper made of one-piece homogeneous material such as an engineering plastic, for example, "Delrin" acetal resin.

Further, the design achieved lends itself well to a gripper which may be machined from plastic stock, or which may be readily reproduced through gripper molding techniques such as the plastic injection molding process.

It is therefore an object of the present invention to produce an article gripper having a part removal force which is substantially greater than a part insertion force.

A further object of the present invention is to provide an article gripper which may be constructed of spring devices which are integral with jaw devices.

Still another object of the present invention is to provide an article gripper which may be of one.piece, homogeneous material Still another object of the present invention is to provide an article gripper which may be either machined or molded according to plastics molding techniques.

SUMMARY OF THE INVENTION

The invention is shown embodied in an article gripper which has a body and means for mounting the body to a gripper carrier. The body has first and second jaws oppositely disposed about a reference axis for containing a desired article, where the first jaw is deflectable from the axis. The body also contains reed spring means including a plurality of parallel reed springs which have a low spring constant and are shiftable in a lateral direction while the reed springs have a relatively high spring constant in a longitudinal direction, i.e. parallel to the reed springs. The reed springs serve to mount the first jaw to the body. An opening is formed between the jaws for insertion and removal of an article as the jaws and article are relatively moved along the axis, and the first jaw has:

(a) first cam means for contacting an article being inserted into the gripper; and
(b) second cam means for contacting an article being removed from the gripper.

A first line of action is defined through the first cam means in a direction transverse to the reed springs, so that the first line of action will receive an insertion force component as an insertion force is applied to an article along the reference axis. A second line of action is defined through the second cam means in a direction approximately parallel to the reed springs, where the second line of action will receive a removal force component as a removal force is applied to an article along the reference axis. The insertion force component and the removal force component will each deflect the first jaw from the reference axis, and the ratio of the removal force to the insertion force is greater than 1.

In an alternate embodiment, the spring mounted jaw is duplicated for the second jaw position, to provide a gripper which is symmetrical about the reference axis, wherein both jaws are deflected from the axis. In the second embodiment. as with the first, the ratio of the removal force to the insertion force is greater than 1.

DESCRIPTION OF THE PREFERRED EMBODIMENT

Figure 1:
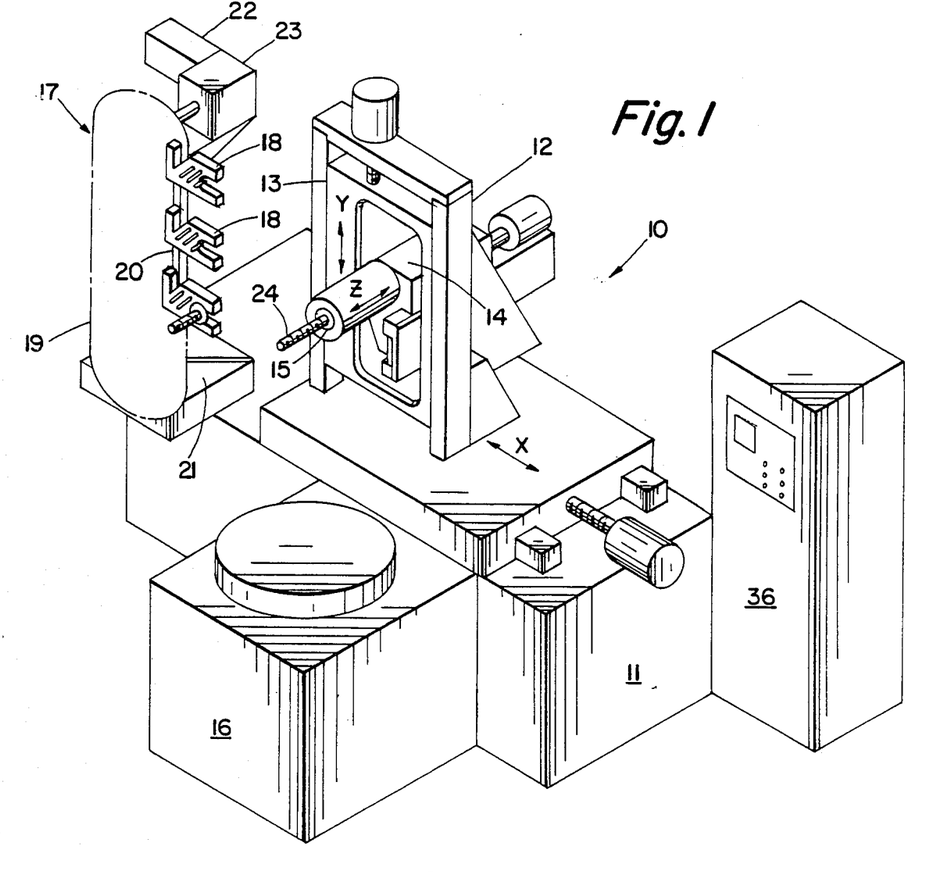
FIG. 1 is a front perspective view of a multiaxis horizontal machining center having a chain.type tool storage matrix.

FIG. 1 of the drawings shows a machine 10 configured as a horizontal machining center used in conjunction with the present invention. The machine 10 has a rear base 11 which carries a column 12 slidable along an X-axis, while the column 12, in turn, carries a vertical saddle 13, i.e. movable in the Y direction. The saddle 13, carries a spindle carrier 14 which is movable in a Z direction on the saddle 13, so that a rotary spindle 15 is provided with three mutually-perpendicular coordinates of movement Suitable drives are shown for propelling the machine components. A machining center 10 of this configuration is commercially available as model HPMC (High Performance Machining Center) from Cincinnati Milacron Inc., assignee of this invention. Here it should be noted that while a preferred arrangement of X, Y, and Z movements is shown, other types of horizontal machining centers will provide for the same total three movements for the machine spindle while the discrete elements may vary in their directions of motion. The machine 10 has a front base 16 which is secured in a fixed relationship to the rear base 11 and is suitable for fixturing a workpiece thereon for machining operations. The workpiece and fixturing methods do not comprise part of the present invention and have been omitted for purposes of clarity.

The rear base 11 supports a tool carrier 17 which, in essence, is a chain matrix tool storage mechanism wherein part-specific tool grippers 18 are positioned along the pitch line 19 of the chain 20. The tool carrier 17 is affixed through a base means 21 to the rear base 11, and the carrier 17 has a drive motor 22 and gear box 23 provided at its upper end for positioning the chain 20 for tool changes. Three representative tool grippers 18 are shown, the center of which is empty and ready to receive a tool 24 carried by the machine spindle 15. The gripper 18 is vertically positioned in line with the spindle 15, so that an X movement is all that is required to insert the tool 24 into the tool gripper 18.

Figure 2:
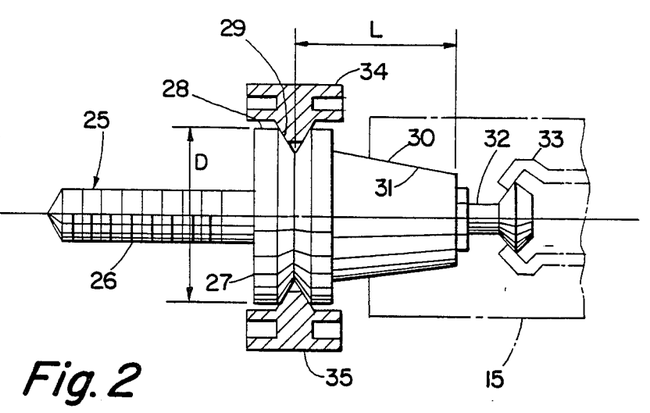
FIG. 2 is a side elevational view of a tool and tool holder.

Referring briefly to FIG. 2, a representative tool 25 is depicted, where the actual cutter 26 may be varietal (end mills, drills, etc.), and the cutter 26 is affixed to a common toolholder 27. The toolholder 27 depicted is of a well.known type known as a "V-flange" toolholder, wherein a circular flange 28 is provided with an annular V-groove 29 for gripping purposes when changing tools. The toolholder 27 has a tapered shank 30 which is received in a cooperating tapered socket 31 of the tool spindle 15. The toolholder 27 is provided with a common retention knob 32 at its rearmost end, so that an internal retention means 33 may draw the toolholder 27 tightly into engagement with the spindle 15. Upper and lower jaw profiles 34,35 are seen supporting the tool about its flange 24. The internal retention means 33 may be one of a variety of well.known mechanisms and does not form part of this invention, and it will be appreciated by those skilled in the art that the internal retention means 33 of the spindle 15 may be selectively applied to clamp and release the tool at desired times. An example of a tool retention means is shown in U.S. Pat. No. 4,605,349 of K. F. Bone, assigned to Cincinnati Milacron Inc., the assignee of the present invention.

In order to represent the proportions of the inventive grippers to those of ordinary skill in the art. two common flanged tool holders may be considered as exemplary., a No. 50 taper tool holder, in which the dimensions "D" and "L" are approximately 3.656 in. (9.374 cm.) and 4.362 in. (11.184 cm.), respectively., and a No. 40 taper tool holder, in which "D" and "L" are approximately 2.280 in. (5.846 cm.) and 3.049 in. (7.817 cm.), respectively.

Further, while certain attitudinal references are made—e.g. "upper" and "lower" , etc. such references are made only by way of explanation and assistance to the reader, and not by way of limitation to any particular frame of reference. It is contemplated that a variety of toolholders 27 may be utilized in conjunction with the present invention; for example, those having outer surfaces other than the V-flange depicted, and those having straight shanks instead of tapered shanks 30. FIG. 1 also shows an automatic control 36; for example a computer numerical control (CNC) which is used in conjunction with the machine 10 to provide automatic operation. One such control is available from Cincinnati Milacron Inc., the assignee of the present invention, and commercially known as the ACRAMATIC 850 CNC control.

The machine 10 depicted in FIG. 1 does not have a separate tool changing arm found in many commercially-available machining centers; rather, the machine makes use of coordinate movements of the spindle 15 cooperating with the tool gripper 18, to accomplish tool changing operations. It will be appreciated by those skilled in the art that a separate tool.changing slide or tool.changing arm can be used with the present invention in certain instances, in accordance with the principles disclosed.

Figures 1A, 3A, 3B, 3C, 3D, 3E:
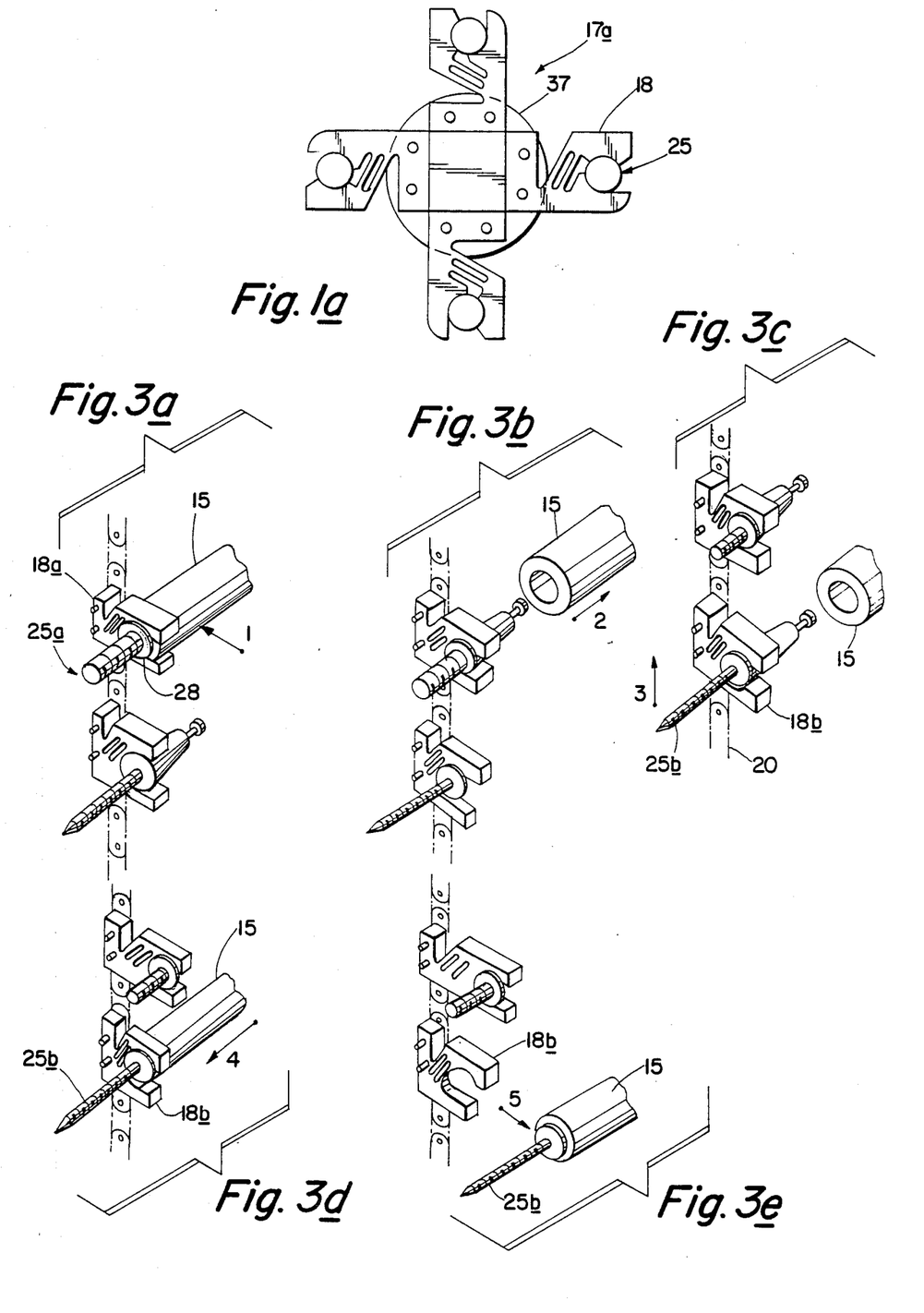
FIG. 1a is a front elevational view of a disc-type tool storage matrix.
FIGS. 3a–3e are a sequence of tool changing moves.

FIG. 1a illustrates a disc-type tool matrix 17a, for an alternate, lower.density, storage of tools 25, where a plurality of tool grippers 18 are affixed to a bidirectional rotary disc 37 carried on the rear base 11.

Toolchanging Sequence

FIGS. 3a–e depict a sequence of events for changing tools on the machine 10 of FIG. 1, as follows:

FIG. 3a shows the spindle 15 being moved radially in the direction of the arrow—step 1—which is an X-axis move of the machine 10. The tool 25a is inserted in the empty gripper 18a with the upper and lower jaws cooperatingly.mated to the flange (Ref. FIG. 2)

FIG. 3b shows the spindle 15 retracting in the arrow direction—step 2—after the internal retention means releases the tool retention knob. Step 2 is a Z-axis move on the machine 10;

FIG. 3c illustrates the next adjacent lower gripper 18b and its respective tool 25b being moved up into alignment with the machine spindle 15 by movement of the tool carrier chain 20 in the direction of the arrow—step 3;

FIG. 3d shows the spindle 15 advanced into engagement with the succeeding tool 25b, by movement of the spindle 15 in the direction of the arrow—step 4. At completion of the step 4 movement, the internal retention means is actuated to clamp the tool retention knob;

FIG. 3e depicts the tool 25b being removed from the tool gripper 18b through movement of the spindle and tool in the direction of the arrow—step 5. The machine 10 is now ready to commence machining operations.

Tool Gripper

Figure 4:
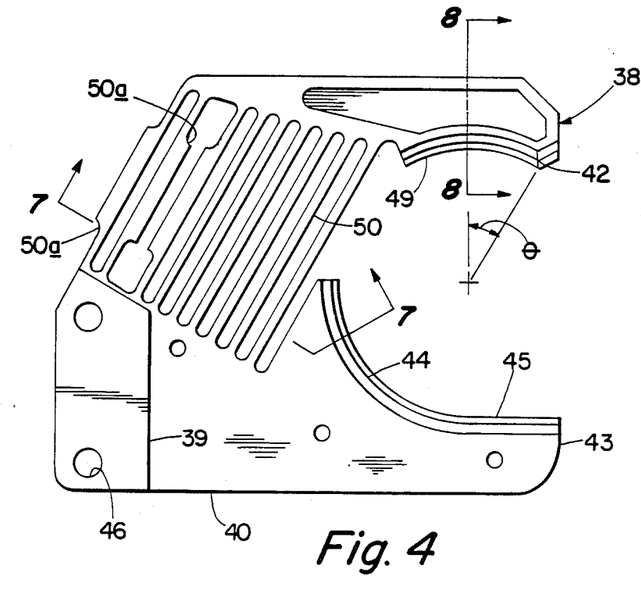
FIG. 4 is a front elevational view of a tool gripper.

FIG. 4 illustrates a front view of a typical gripper 38 slightly differing from that shown in FIG. 1, as it would appear at the position for tool change. This gripper 38 depicted was machined from "Delrin" 150 acetal resin plate, a well-known engineering thermoplastic. The gripper 38 has a unitary width, and is fitted, on occasion, with an extension block 39, keyed into the main body 40 of the gripper 38 and held by cap screws 41 inserted from the reverse side. The extension block 39 is described with FIG. 5, below. The gripper shape depicted in FIG. 4 is referred to as an "asymmetrical" design, i.e. where the upper and lower jaws 42,43 are not identical and are not identically supported on the main body 40 of the gripper 38. The lower jaw 43 is provided with a quarter-round cutout 44 which is configured to the diametral cross section of the V-flange 28 of the toolholder 27 (see FIG. 5). The outboard end 45 of the lower jaw 43 runs tangent to the cutout 44 and is of a cooperating cross section, as well. The lower jaw 43 is integral with the main body 40, relatively stiff. and of unit width for supporting tools which must be aligned in a vertical direction with the machine spindle 15 for successive tool changes.

Figure 5:
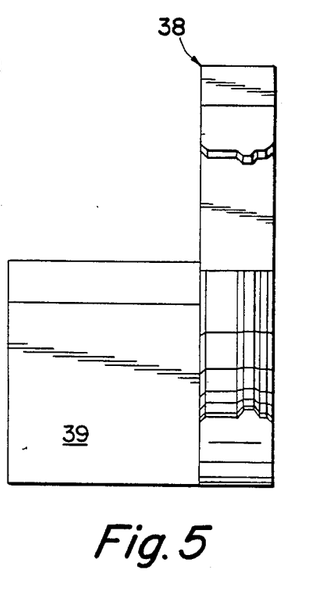
FIG. 5 is a side elevational view of the tool gripper of FIG. 4.
Figure 6:
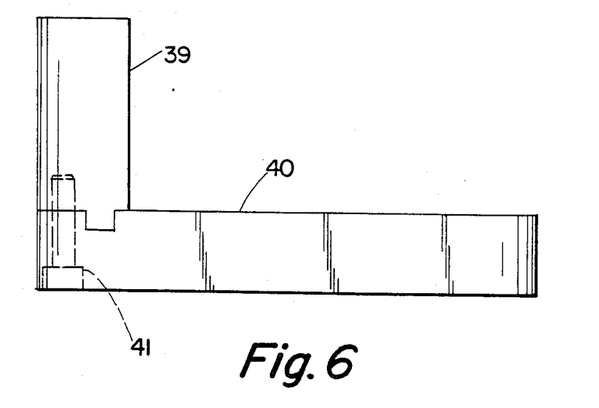
FIG. 6 is a bottom plan view of the tool gripper of FIG. 4.

Referring to FIG. 5, since the gripper 38 is of unit width, the upper and lower jaws 42,43 lie in the same plane. In the event that lightweight tools are employed, or tools which are especially balanced about the lower jaw 43, it may be necessary to only use the gripper body 40 without the extension block 39. In such case, the plate-like body 40 would be simply pinned to the pin joints of a single chain and would not experience problems associated with overturning moments, i.e. which would tend to cock the gripper out of its normal attitude. When heavy, overhanging loads are seen on various tools and toolholders, it may sometimes become desirable to utilize the extension block 39 which provides, at its outermost end, a pair of pin joint holes 46 in line with like holes (not shown) in the rear of the gripper body 40. In this case, tandem chains 47 are employed (see FIG. 14), and the gripper 38 and block 39 are pinned, as a unit, to both chains 47. In certain cases, it may also be desirable to laminate stiffening plates 48 to the gripper 38 in the manner shown in FIG. 26, to prevent out-of-plane distortion of the jaws 42,43.

The upper jaw 42 of the gripper 38 has an arcuate gripper surface 49 which, like the lower jaw cutout 44, is configured to the V-flange cross section of the toolholder, with the maximum dimension "D" of a tool flange 28, occurring at the central, gripped position and from which, generally, the radius-of-curvature of each jaw is swung. A certain amount of wrap-around to angle theta, right and left of center, here chosen as approximately 30', is provided so that the tool will be prevented from inadvertent radial movement, once centered in the gripped position.

Figure 7:
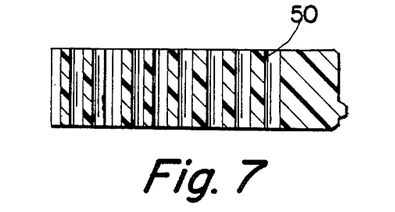
FIG. 7 is a sectional view through the tool gripper, taken along the line 7—7 of FIG. 4.
Figure 8:
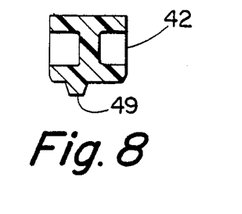
FIG. 8 is a sectional view through a gripper jaw, taken along the line 8-8 of FIG. 4.

The upper jaw 42 is mounted to the main body 40 of the gripper 38 by integral reed springs 50 which are parallel to one another and of unit width, as shown in FIG. 7. In the support of a first member on a second member, lateral spring loading, i.e. normal to the reed planes, will cause a lateral shift of the first member while maintaining its attitude (in the case of equal-length reeds). In such case, equal reeds will experience equal stresses. The reed springs 50 depicted are of slightly unequal lengths, to fit a particular design space, and it is intended that the upper jaw 42 will flex laterally as the reed springs 50 are laterally deflected. When experiencing pure lateral loading, it may be desired that the bending stress in all of the reed springs 50 remain nearly constant for good life.

The stress in the laterally-deflected reeds may be computed according to the following formula for stress:

$$S = \frac{3Eyd}{L^2}$$

and, where S is a constant, chosen as 6000 psi., $$\left(4.052 \times 10^3 \frac{nt}{cm^2}\right);$$

d = thickness of reed, inches (cm);
L = length of reed, inches (cm);
y = deflection of reed, inches (cm); and
E = modulus of elasticity, 334,000 psi $$\left(2.256 \times 10^5 \frac{nt}{cm^2}\right)$$

Using $$d = \frac{L^2 S}{3Ey},$$

the following table results for computing reed thickness, d, from the constant stress model:

| Reed No. | @ L, inches (cm) | d, inches (cm) |
|---|---|---|
| 1 | 3.40 (8.635) | .138 (.350) |
| 2 | 3.3 (8.381) | .130 (.330) |
| 3 | 3.2 (8.127) | .122 (.310) |
| 4 | 3.1 (7.873) | .115 (.292) |
| 5 | 3.0 (7.619) | .107 (.272) |
| 6 | 2.9 (7.365) | .101 (.257) |
| 7 | 2.8 (7.111) | .094 (.239) |
| 8 | 2.73 (6.933) | .090 (.229) |
| 9 | 2.70 (6.857) | .087 (.221) |

L may be determined by layout as in the present example, since it will be appreciated that the maximum height of the gripper is limited when it is expected that each corresponding chain link carry a tool gripper. When adjacent corresponding links are left open the tool gripper may of course, be of larger size.

Figure 9:
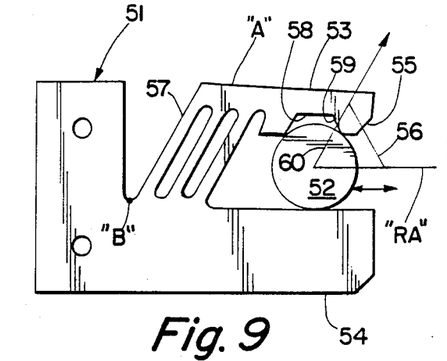
FIG. 9 is a schematic view of the tool gripper of FIG. 4.
Figure 10:
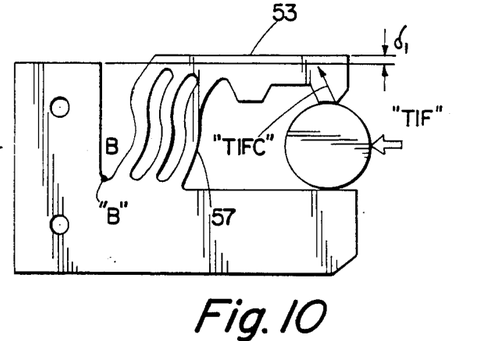
FIG. 10 is a view of the tool gripper of FIG. 9 showing a tool being inserted.
Figure 11:
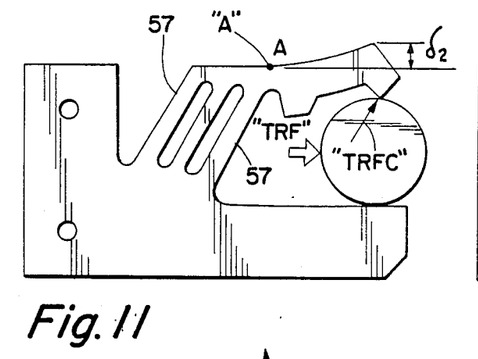
FIG. 11 is a view of the gripper of FIG. 9, showing a tool being removed.

Referring to FIGS. 9. 10 and 11 in conjunction with one another, the simplified grippers 51 depicts only three reed springs, so the invention is easily realized.

FIG. 9 shows a representative cylindrical toolholder 52 gripped between the upper and lower jaws, 53,54 and it will be appreciated that the jaws 53,54 may have a variety of cutouts so long as the toolholder 52 is adequately retained. It will also be appreciated that the toolholder 52 need not be round, but rather, a variety of cross sections may be gripped as well; for example, 3 and 4-lobed polygon cross sections. FIG. 9 illustrates that the upper jaw 53 is provided with a first cam means or inlet cam surface 55 (in some cases a simple chamfer) which will be contacted by an incoming toolholder 52, thereby establishing a line of contact 56 between the jaw 53 and toolholder 52 along which a tool insertion force component "TIFC" will be directed as the gripper 51 and toolholder 52 are relatively moved toward one another under influence of a tool insertion force "TIF", applied along a horizontal radial line, or reference axis "RA", passing through the center of the toolholder. The insertion force component "TIFC" is arranged to be principally directed in a direction transverse to the reed springs, to cause them to shift in a lateral direction; see FIG. 10, where the tool insertion force "TIF" is depicted by the broad arrow. The upper jaw 53 will tend to be shifted to the left and upward in the figure, relative to a reference point "B" defined at the base of the reed springs 57.

The gripping cutout 58 of the upper jaw 53 is provided with a second cam means, or outlet cam surface 59, which interacts with the outer surface of the toolholder 52 as the toolholder 52 is removed from the gripper 51, thereby creating a line of action 60 for a tool removal force component "TRFC"—at least during initial movement of the toolholder 52 out of the tool gripper 51. The reed springs 57 are arrayed parallel to the tool removal force component "TRFC" and line of action 60 at angle alpha (approximately 30') so that the reed springs 57 will tend not to undergo a lateral shift, i.e. in their direction of relatively weak spring constant, but rather, the force will be applied substantially longitudinally to the reed springs, manifesting itself both in the form of a direct tensile force, and an overturning moment which tends to put a compressive stress on the leftmost reed springs. Referring to FIG. 4, the leftmost springs may therefore be provided with a slightly thicker center portion or pad 50a to resist any buckling of the reed springs 50 under compressive load, thereby reinforcing one another. FIG. 9 schematically shows that the removal force "TRF" will tend to bend the upper jaw about a reference point "A", i.e. the jaw 53 tends to behave as a stiff cantilever beam. FIG. 11 shows a tool removal force "TRF" applied in the direction of the broad arrow, causing the jaw 53 to deflect upwardly a distance, delta 2.

As stated above, with reference to FIG. 4, the preferred embodiment for a gripper 38 for use in the tool carrier 17 of FIG. 1 (see also FIGS. 9-11), comprises an asymmetrical shape, where the lower jaw 43 is relatively rigid with the main body 40 and is aligned with the tool path (i.e. parallel to the reference axis "RA") at the pickup position. Subsequently, as the grippers 38 migrate to the opposite side of the chain circuit, opposite the tool pickup, gravitational forces will act against the deflectable jaw 42, as the gripper 38 is inverted. However, it is not necessary to maintain the precise centering of the toolholder on the inverted grippers 38 remote from the toolchanging zone. Additionally, it will be appreciated that, at the lower bend of the chain circuit in FIG. 1, the weight of the tool will tend to open the jaws, but the relatively stiff spring constant of the reed springs in the longitudinal direction will serve to maintain the tool in position in the manner described with FIG. 11.

Figure 12:
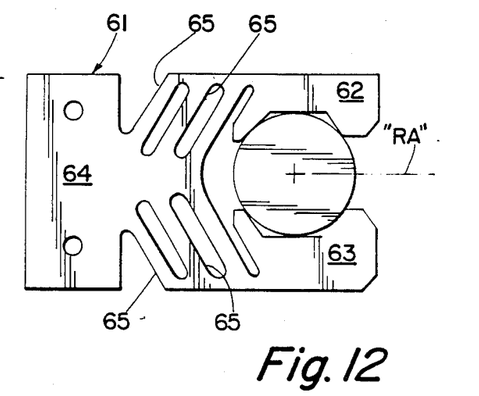
FIG. 12 is a front elevational view of a symmetrical tool gripper.

FIG. 12, however, is a modified, symmetrical embodiment of a tool gripper 61, wherein both the upper and lower jaws 62,63 are spring-mounted to the gripper body 64 through like pluralities of parallel reed springs 65, to create a mirror-image structure about the reference axis "RA".

It is noted that a variety of constructional materials may be used for the gripper body, but in the preferred embodiment the engineering plastic "Delrin" is used. It is contemplated that many types of plastics would be suitable for use, at the choice of the designer; for example, a variety of thermoplastic resins and thermoset resins. Further, materials may be utilized in bar stock and plate forms, or in molded shapes such as may be produced, for example by the injection molding process. Depending on design requirements, certain reinforcements—for example, glass fibers—may conjoin with the resins to enhance performance of the gripper.

Figure 13:
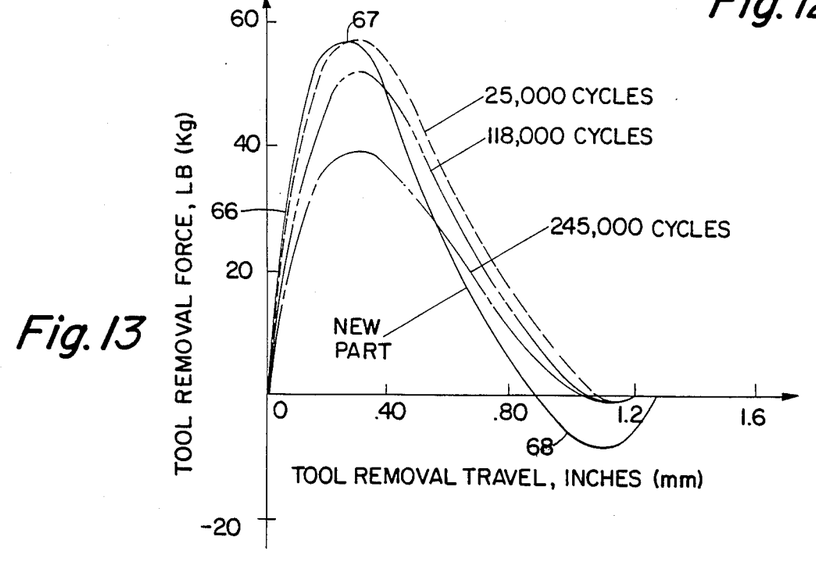
FIG. 13 is a graph showing tool removal force versus tool travel for a molded tool gripper.
Figure 16:
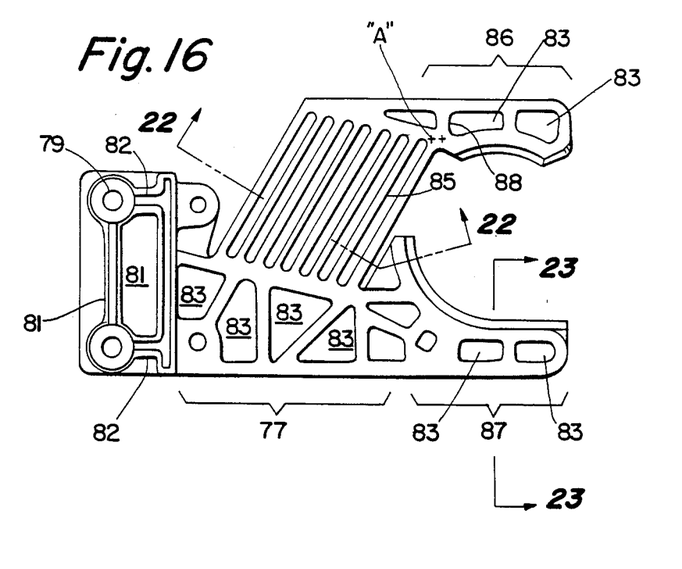
FIG. 16 is a front elevational view of an injection molded tool gripper.
Figure 18:
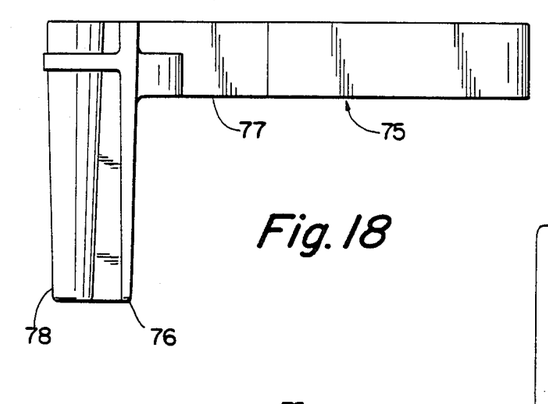
FIG. 18 is a top plan view of the molded tool gripper of FIG. 1b.
Figure 19:
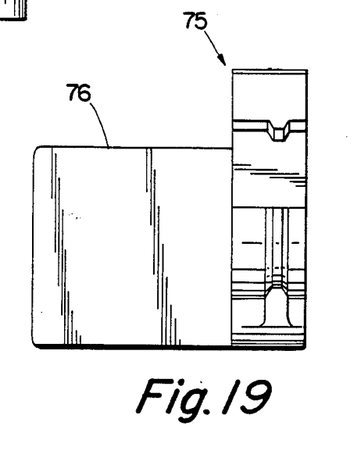
FIG. 19 is a right side elevational view of the molded tool gripper of FIG. 16.
Figure 20:
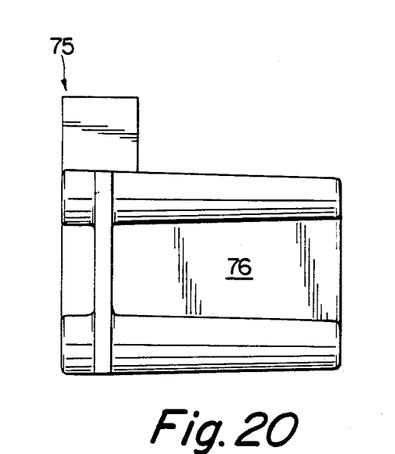
FIG. 20 is a left side elevational view of the molded tool gripper of FIG. 16.

FIG. 13 is a graph plotting the gripper tool removal force "TRF" versus travel of the tool outward from the zero, or gripped position. The four curves depicted are for the same part; an injection molded gripper depicted in FIGS. 16.21. Similar curves could be plotted for other sizes of molded grippers and machined grippers, alike. The four curves depicted show the gripper: as a NEW PART; at 25,000 CYCLES; at 118,000 CYCLES; and at 245,000 CYCLES. Considering the lower jaw as essentially rigid, the removal spring rate for the upper jaw is nearly linear, and is expressed in the initial, positive-slope of the curve 66 from zero. The peak force 67 is lessened somewhat during the life testing of the part, and, it will be noted that a portion 68 of the removal force curve is actually a negative number, i.e. where the line dips below the X ordinate. This plotted negative force portion is apparently realized because the inherent springiness of the gripper jaws tends to squeeze—and thus "shoot"—the part from the jaws due to spring-back of the jaws against the tool diameter.

Figures 14, 15, 17:
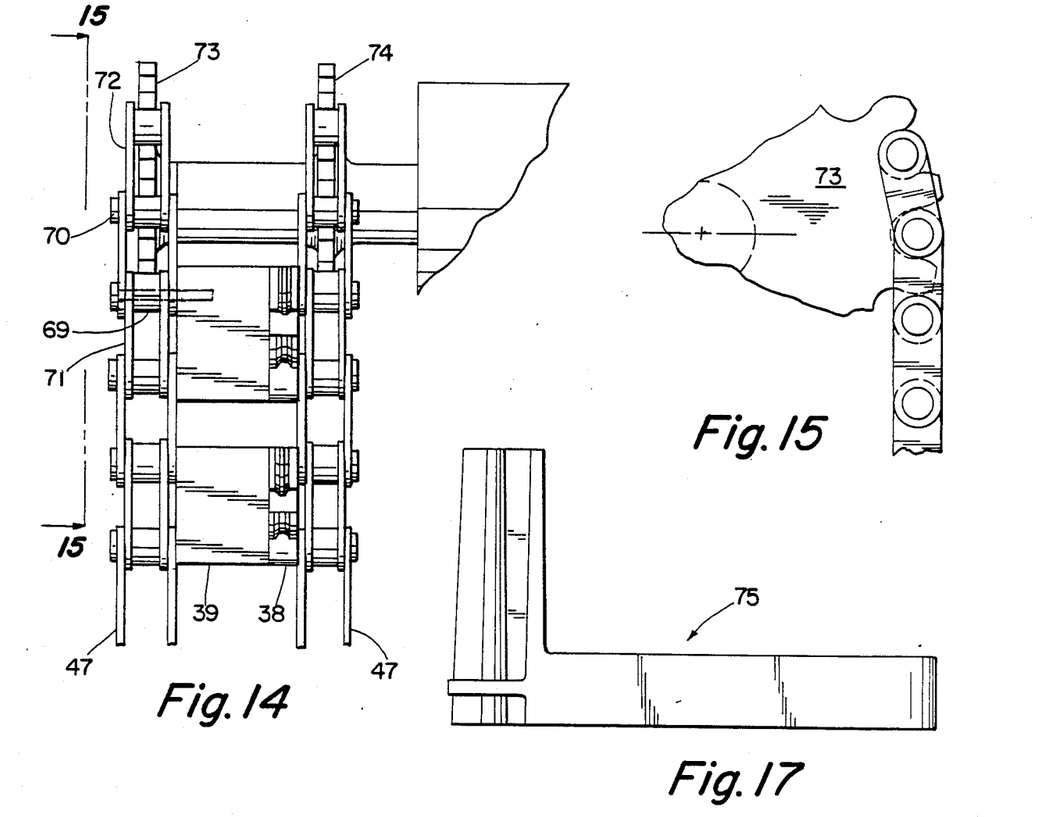
FIG. 14 is a side elevational view of a chain-type tool carrier, having a plurality of tool grippers.
FIG. 15 is a partial front elevational view of a drive sprocket for moving plural chains.
FIG. 17 is a bottom plan view of the molded tool gripper of FIG. 16.

FIG. 14 is a side view of the tool carrier 17 of FIG. 1, illustrating in detail how grippers 38 could be attached to the links of tandem chains 47. The chains 47 have a roller 69 journalled on a link pin 70 which extends through inner and outer link plates 71,72 and is affixed in the tool gripper 38 and its extension 39. The chains 47 are trained over spaced-apart drive sprockets 73,74.

Figure 23:
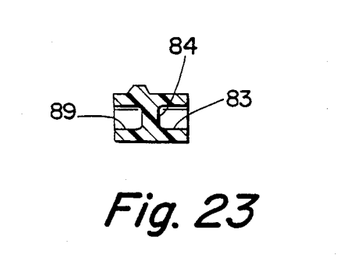
FIG. 23 is an elevational sectional view taken along the line 23–23 of FIG. 16.

FIGS. 16-23 describe a molded version of a tool gripper 75 with certain changes to the design to facilitate easily the molding process. The gripper extension 76 is integral with the main body 77, with generally cylindrical walls 78 surrounding the pin holes 79. The main stiffening wall 80 of the extension 76 has been thinned-out and a cored pocket 81 is formed between the wall 80 and strengthening ribs 81,82 which stiffen the tubular walls 78. The gripper 75 has a pattern of cored-out sections 83,89 which extend from both sides to central stiffening web 84 (FIG. 23). The parallel reed springs 85 are each of the same length and thickness, extending from a common base line, at the main body 77. The cored sections 83,89 of the jaws 86,87 create an "I-beam" type cross section, and the upper jaw 86 is further strengthened with a rib 88 at the point of expected flexure, "A", relative to the reed springs 85.

Figure 21:
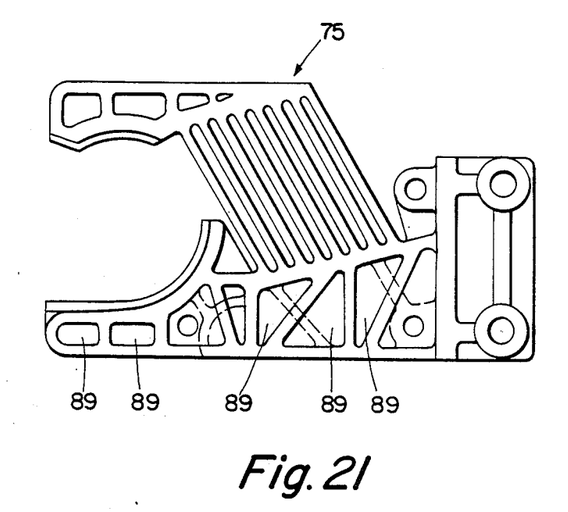
FIG. 21 is a rear elevational view of the molded tool gripper of FIG. 16.
Figure 22:
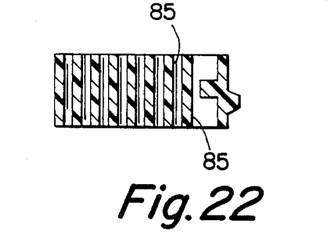
FIG. 22 is a sectional view taken along the line 22–22 of FIG. 16.

The reverse side of the gripper 75, depicted in FIG. 21, is similarly constructed, but the cored openings 89 create ribs which criss-cross the ribs of the front side (shown dotted), for additional strength. This design economizes on material, allows for proper cooling, and facilitates gating of the material in the molds.

A very important feature of the plastic gripper design is that a high pullout force is achieved without preloading the jaws against the gripped part. Heavily loaded plastic members may tend to lose their preload over time, due to the phenomena of stress relaxation and creep.

Alternate Embodiments

Drive Key Systems

Figure 24:
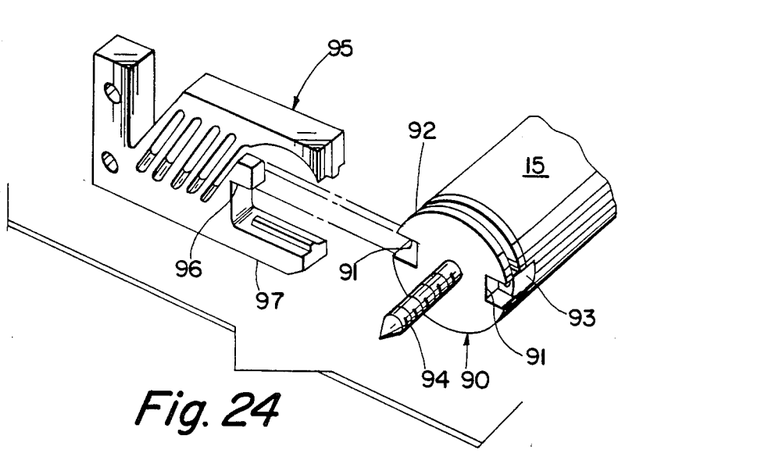
FIG. 24 is a perspective view of a tool gripper in a drive key system.

FIG. 24 depicts a toolholder 90 with 180' opposed keyways 91 in its flange 92, driven by drive keys 93 affixed to the spindle 94. In machines employing drive keys 93, the spindle 15 is repetitively oriented to the same rotary position to change tools 94. To assure that the tools 94 remain in the correct orientation while in storage the gripper 95 may be manufactured, for example, with a key portion 96 on the lower jaw 97.

Vertical Machining Center

Figure 25:
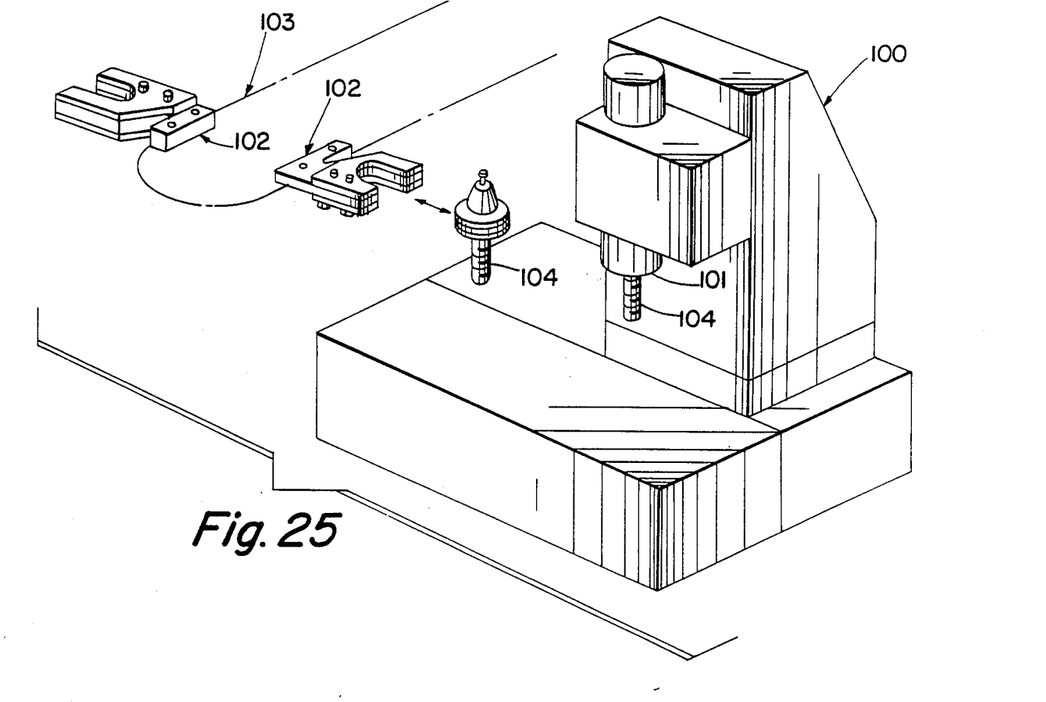
FIG. 25 is a perspective view of a tool gripper system in a vertical machining center.
Figure 26:
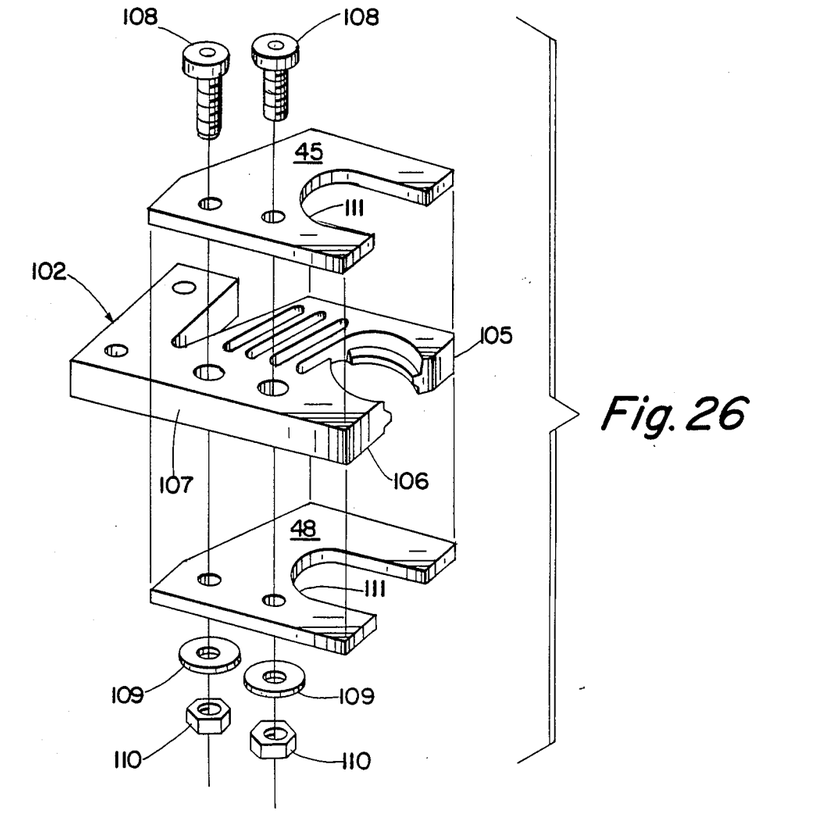
FIG. 26 is an exploded view of the tool gripper of FIG. 25.

FIG. 25 illustrates the invention embodied in a vertical machining center 100 having X,Y, and Z movements, where the machine spindle 101 has its main rotary axis in a vertical orientation. The tool grippers 102 of the tool carrier 103 lie in a horizontal plane to exchange tools 104 at the tool pickup position. To prevent unwanted tipping of the jaws 105,106 with respect to the main body 107 of the gripper 102, a pair of stiffening plates 48 are sandwiched with the gripper 102, as shown in FIG. 26. Screws 108 passing through the fixed body 107 and the plates 48, are assembled with washers 109 and nuts 110 to maintain a slight clearance between the laminated plates 48 and jaws 105,106, so that the reed-mounted deflectable jaw 105 can freely operate. The plates 48 have cut-outs 111 to clear the tool 104.

The symmetrical gripper 61 of FIG. 12 is likewise applicable to vertical systems (FIG. 25), depending on the loads involved and space available along the tool chain.

Workpiece Loader

Figure 27:
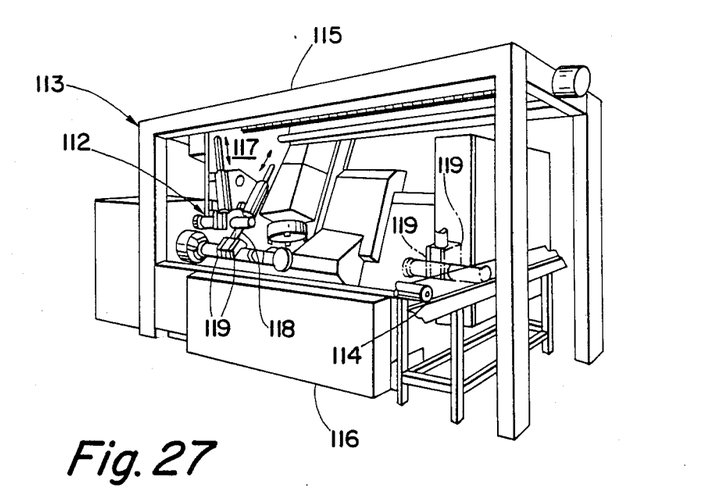
FIG. 27 is a perspective view of a turning machine employing grippers in a workpiece loader.

In still another alternate embodiment, FIG. 27, the article gripper 112 is shown in a gantry loader 113 for workpieces 114, often used with turning machines and grinding machines. The loader has a frame, or gantry 115, bridging the machine tool 116, and a slide 117 is movable along the gantry 115 axially of the workpiece 114. The slide 117, in turn, carries a pair of rams 118 movable radially of the workpiece 114, shuttled in see-saw fashion. At the end of the ram 118 is a pair of tandem grippers 119 working as one, for gripping a shaft-like workpiece 114. With shorter workpieces, one gripper may suffice. In certain prior art systems, for example, that disclosed in U.S. Pat. No. 4,348,044 (assigned to Cincinnati Milacron Inc; the assignee of the present invention). the gripper must be powered between open and closed positions. In the depiction of FIG. 27, the grippers are forced over the diameter of the workpiece 114 to be loaded, at an insertion force level, and the higher removal force will serve to maintain the grip on the workpiece 114 during its excursion to the machine loading zone. Once loaded between centers, the passive gripper 119 may then be pulled off the workpiece 114 by a longitudinal removal force applied upwardly to the ram. The loading system described achieves the objectives of an effective, low-cost and highly reliable workpiece article gripper.

While the invention has been shown in connection with a preferred embodiment and several alternate embodiments, it is not intended that the invention be so limited. Rather, the invention extends to all such designs and modifications as come within the scope of the appended claims.

What is claimed is:

1. An article gripper, comprising:
a body, including means for mounting said body to a gripper carrier;
first and second jaws on said body, oppositely disposed about a reference axis, said first jaw being deflectable from said axis;
reed spring means for mounting said first jaw to said body, including a plurality of parallel reed springs joined for common action, said reed springs having a relatively low spring constant and being shiftable in a lateral direction, while having a relatively high spring constant in a longitudinal direction, parallel to said reed springs;
an opening between said jaws for insertion and removal of an article as said jaws and article are relatively moved along said axis;
first cam means on the first jaw for contacting an article being inserted into said gripper;
second cam means on the first jaw for contacting an article being removed from said gripper;
a first line of action defined through the first cam means in a direction transverse to said reed springs, said first line of action receiving an insertion force component as an insertion force is applied to an article along said reference axis;
a second line of action defined through the second cam means in a direction approximately parallel to said reed springs, said second line of action receiving a removal force component as a removal force is applied to an article along said reference axis;
whereby said insertion force component and said removal force component will deflect said first jaw from said reference axis and wherein the ratio of the removal force to the insertion force is greater than one.

2. The article gripper of claim 1, wherein said gripper is of one-piece construction.

3. The article gripper of claim 1, wherein said gripper is of molded one-piece construction.

4. The article gripper of claim 2, wherein said gripper is made of plastic.

5. The article gripper of claim 2, wherein said gripper is made of a thermoplastic resin.

6. The article gripper of claim 2, wherein said gripper is made of a thermosetting plastic resin.

7. The article gripper of claim 3, wherein said gripper is made of plastic.

8. The article gripper of claim 3, wherein said gripper is made of a thermoplastic resin.

9. The article gripper of claim 3, wherein said gripper is made of a thermosetting plastic resin.

10. An article gripper, comprising:
a body, including means for mounting said body to a gripper carrier;
first and second jaws on said body, oppositely disposed about a reference axis, said first jaw being deflectable from said axis, said second jaw being solid with said body;

a gripper surface on said first jaw cooperatingly-mated with an article periphery and partially-spanning said article periphery, for holding an article on said second jaw;

reed spring means for mounting said first jaw to said body, including a plurality of parallel reed springs joined for common action, said reed springs having a relatively low spring constant and being shiftable in a lateral direction, while having a relatively high spring constant in a longitudinal direction, parallel to said reed springs;

an opening between said jaws for insertion and removal of an article as said jaws and article are relatively moved along said axis;

first cam means on the first jaw for contacting an article being inserted into said gripper;

second cam means on the first jaw for contacting an article being removed from said gripper;

a first line of action defined through the first cam means in a direction transverse to said reed springs, said first line of action receiving an insertion force component as an insertion force is applied to an article along said reference axis;

a second line of action defined through the second cam means in a direction approximately parallel to said reed springs, said second line of action receiving a removal force component as a removal force is applied to an article along said reference axis;

whereby said insertion force component and said removal force component will deflect said first jaw from said reference axis and wherein the ratio of the removal force to the insertion force is greater than one.

11. The article gripper of claim 10. wherein said gripper is of one-piece construction.

12. The article gripper of claim 10, wherein said gripper is of molded one-piece construction.

13. The article gripper of claim 11. wherein said gripper is made of plastic.

14. The article gripper of claim 11, wherein said gripper is made of a thermoplastic resin.

15. The article gripper of claim 11, wherein said gripper is made of a thermosetting plastic resin.

16. The article gripper of claim 12, wherein said gripper is made of plastic.

17. The article gripper of claim 12. wherein said gripper is made of a thermoplastic resin.

18. The article gripper of claim 12, wherein said gripper is made of a thermosetting plastic resin.

19. An article gripper. comprising:

a body, including means for mounting said body to a gripper carrier;

a pair of identical jaw assemblies jaws on said body, oppositely disposed about a reference axis, each jaw assembly comprising:

a jaw deflectable from said axis; reed spring means for mounting said jaw to said body, including a plurality of parallel reed springs joined for common action, said reed springs having a relatively low spring constant and being shiftable in a lateral direction, while having a relatively high spring constant in a longitudinal direction, parallel to said reed springs;

first cam means on the jaw for contacting an article being inserted into said gripper;

second cam means on the jaw for contacting an article being removed from said gripper;

a first line of action defined through the first cam means in a direction transverse to said reed springs, said first line of action receiving an insertion force component as an insertion force is applied to an article along said reference axis;

a second line of action defined through the second cam means in a direction approximately parallel to said reed springs, said second line of action receiving a removal force component as a removal force is applied to an article along said reference axis;

an opening between said jaws for insertion and removal of an article as said jaws and article are relatively moved along said axis;

whereby said insertion force component and said removal force component will deflect said first jaw from said reference axis and wherein the ratio of the removal force to the insertion force is greater than one.

20. The article gripper of claim 19, wherein said gripper is of one-piece construction.

21. The article gripper of claim 19, wherein said gripper is of molded one-piece construction.

22. The article gripper of claim 20, wherein said gripper is made of plastic.

23. The article gripper of claim 20, wherein said gripper is made of a thermoplastic resin.

24. The article gripper of claim 20, wherein said gripper is made of a thermosetting plastic resin.

25. The article gripper of claim 21, wherein said gripper is made of plastic.

26. The article gripper of claim 21, wherein said gripper is made of a thermoplastic resin.

27. The article gripper of claim 21, wherein said gripper is made of a thermosetting plastic resin.

* * * * *